(12) United States Patent
Dinh et al.

(10) Patent No.: US 7,475,086 B2
(45) Date of Patent: Jan. 6, 2009

(54) METHOD OF AUTOMATICALLY REMOVING LEADING AND TRAILING SPACE CHARACTERS FROM DATA BEING ENTERED INTO A DATABASE SYSTEM

(75) Inventors: Hung T. Dinh, Austin, TX (US); Teng Hu, Austin, TX (US); Phong A. Pham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 11/421,132

(22) Filed: May 31, 2006

(65) Prior Publication Data

US 2007/0282849 A1    Dec. 6, 2007

(51) Int. Cl.
*G06F 17/30* (2006.01)

(52) U.S. Cl. .............. 707/101; 707/1; 707/3; 707/100; 707/103 R

(58) Field of Classification Search ............ 707/1–4, 707/10, 100–104.1; 382/309, 310
See application file for complete search history.

(56) References Cited

U.S. PATENT DOCUMENTS

| | | | |
|---|---|---|---|
| 5,283,856 A * | 2/1994 | Gross et al. ............ | 706/47 |
| 6,247,018 B1 * | 6/2001 | Rheaume ................ | 707/102 |
| 2005/0192792 A1 * | 9/2005 | Carus et al. ............. | 704/2 |
| 2006/0059165 A1 * | 3/2006 | Bosloy et al. ........... | 707/10 |
| 2006/0224958 A1 * | 10/2006 | Farrow ................... | 715/541 |

* cited by examiner

*Primary Examiner*—Cam-Linh Nguyen
(74) *Attorney, Agent, or Firm*—Matt Talpis; Gregory K. Goshorn; Greg Goshorn, P.C.

(57) ABSTRACT

A computer Implemented method of automatically removing space characters from data being entered into a database system are provided. When a user creates a table in a database system into which data having leading and/or trailing character spaces may be entered, the user may specifically instruct the database system to remove any character spaces before entering the data into the table. Consequently, when a piece of data is being entered into the table, the database system will determine whether the piece of data includes leading and/or trailing character spaces. If so, the database system will automatically remove the character spaces from the piece of data before it is entered into the table. Hence, the use of TRIM functions when retrieving data from the database system will be obviated.

4 Claims, 8 Drawing Sheets

| SUBSCRIPTIONS ||
| CUSTOMER | SUBSCRIPTION |
| --- | --- |
| JOHN DOE | TIME |

802    804

SELECT RTRIM(LTRIM(CUSTOMER)) FROM SUBSCRIPTIONS WHERE RTRIM(LTRIM(SUBSCRIPTION))= 'TIME';

806    808

PRIOR ART

SELECT TRIMALL CUSTOMER FROM SUBSCRIPTIONS WHERE SUBSCRIPTION='TIME';

FIG. 9

METHOD OF AUTOMATICALLY REMOVING LEADING AND TRAILING SPACE CHARACTERS FROM DATA BEING ENTERED INTO A DATABASE SYSTEM

CROSS-REFERENCE TO RELATED APPLICATIONS

The present invention is related to application Ser. No. 11/421,123, entitled, SYSTEM, COMPUTER PROGRAM PRODUCT AND METHOD OF SIMPLIFYING COMMANDS FOR RETRIEVING DATA FROM A DATABASE SYSTEM WITHOUT LEADING AND TRAILING SPACE CHARACTERS, herein, filed on even date herewith and assigned to a common assignee.

BACKGROUND OF THE INVENTION

1. Technical Field

The present invention is generally directed to database systems. More specifically, the present invention is directed to a system, computer program product and method of automatically removing leading and trailing space characters from data being entered into a database system.

2. Description of Related Art

A database system is a computerized data storage and retrieval system. To manage the data in a database system, a database management system (DBMS) is used. A DBMS is a collection of programs that enables a user to enter, organize, and retrieve data from a database system.

Requests for information from a database system are generally made in the form of a query using a query language. Different DBMSs have different query engines that support different query languages. (A query engine is a search engine that searches a database system using keywords or phrases entered by a user.) However, one query language (i.e., Structured Query Language or SQL) has become standard since it has been adopted by both the American National Standards Organization (ANSI) and the International Standards Organization (ISO). Thus, the invention will be explained using SQL. However, it should be understood that the invention is not thus restricted. That is, the use of any other query language is well within the scope of the invention. Hence, SQL is used just for illustrative purposes only.

When a user sends an SQL query to a database system, the query will be executed and a result returned. The result ordinarily comprises a set of rows and columns as results are generally returned in the form of tables.

Data in a database system often includes a leading, a trailing or both leading and trailing space characters as space is often used as a delimiter to separate different pieces of data that are being entered in the database system. Further, a user entering data in the database system may inadvertently add some extra space characters at the beginning and/or end of a piece of data. Consequently, before data is presented to a user, leading and/or trailing space characters are usually removed.

Currently, TRIM functions, available in SQL, are used to remove leading and/or trailing space characters from data being presented to a user. Particularly, an application program developer has to integrate the TRIM function in the program such that the TRIM function operates on every column of data that is being retrieved or the user has to incorporate the TRIM function in the SQL request. This workaround causes the program or the SQL statements to be unreadable. Further, when functions are used on values in columns, table scans are performed instead of index searches. As is well known in the field, table scans are much slower than index searches. Thus, using the TRIM functions may adversely affect performance.

Consequently, what is needed are a system, computer program product and method of automatically removing leading and trailing space characters from data that is to be entered into a database system.

SUMMARY OF THE INVENTION

The present invention provides a computer Implemented method of automatically removing space characters from data being entered into a database system. The computer Implemented method enables a user to instruct a database system to remove space characters from data being entered therein. When this instruction is given, the database system will determine, whether a piece of data being entered therein contains at least one space character. If so, the database system will automatically remove, as instructed, the space character from the piece of data before it is entered therein. The space character may be a leading or a trailing space character. Further, in the case where there is more than one space character, the space characters may be both leading and trailing space characters.

In a particular embodiment, the instruction to remove space characters from data being entered in the database system is given at table creation time. Specifically, to enter data in the database system, a table has to be created into which the data may be entered. When creating the table, the user may indicate that any space characters that may have been added to any piece of data that is to be entered in one, a few or all columns of the table into which data characters may be entered have to be removed before the piece of data is actually entered into the table. When this instruction is given, character data will be entered into the table with all added space characters removed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 depicts a conventional command that may be used to retrieve data from the table in FIG. 7.

FIG. 9 illustrates an exemplary command that may be used by the invention to retrieve data from the table in FIG. 7.

DETAILED DESCRIPTION OF THE PREFERRED EMBODIMENT

Figure 1:
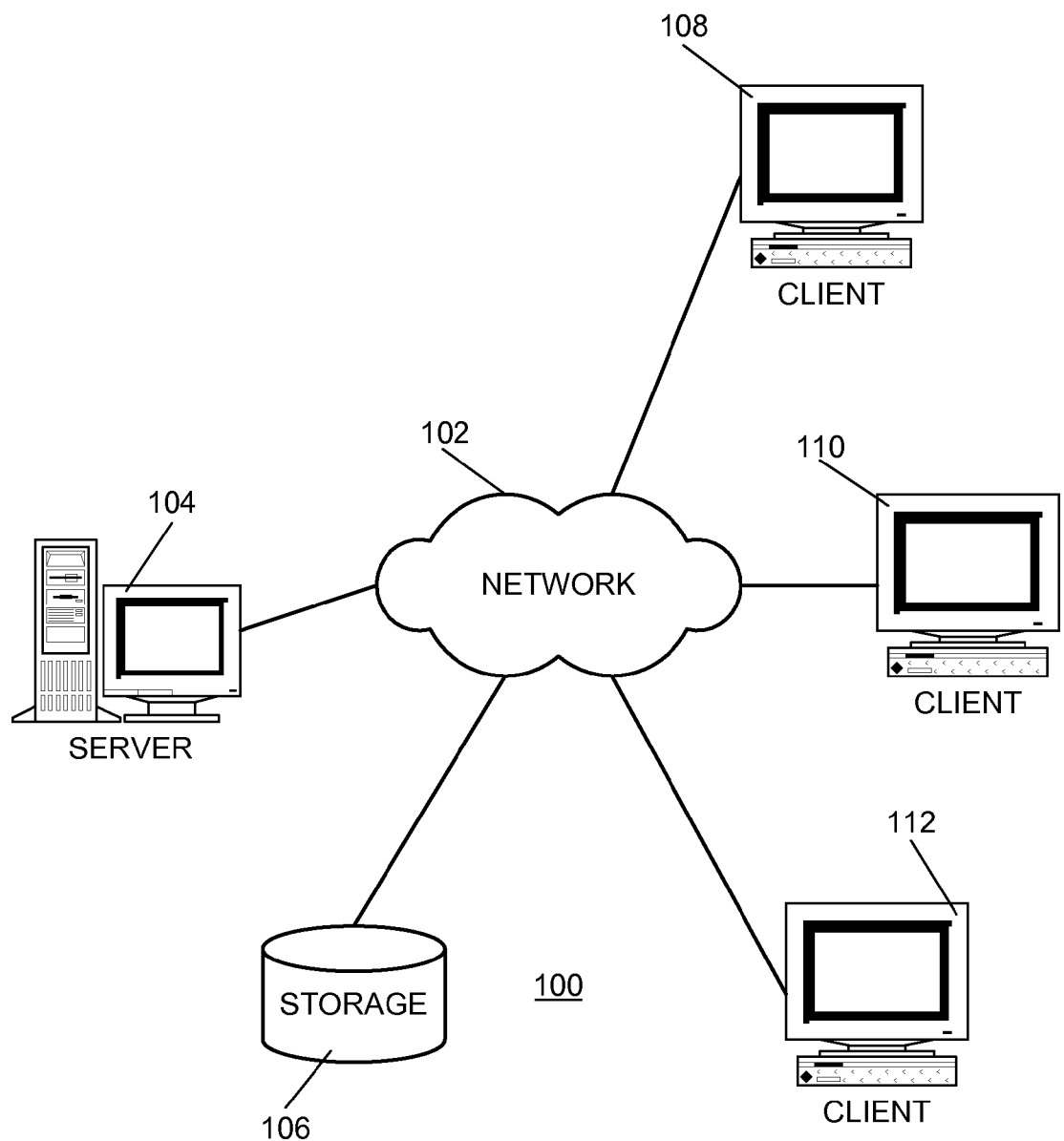
FIG. 1 is an exemplary block diagram illustrating a distributed data processing system according to the present invention.

With reference now to the figures, FIG. 1 depicts a pictorial representation of a network data processing system 100 in which the present invention may be implemented. Network data processing system 100 contains a network 102, which is the medium used to provide communications links between various devices and computers connected together within network data processing system 100. Network 102 may include connections, such as wire, wireless communication links, or fiber optic cables etc.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another.

Figure 2:
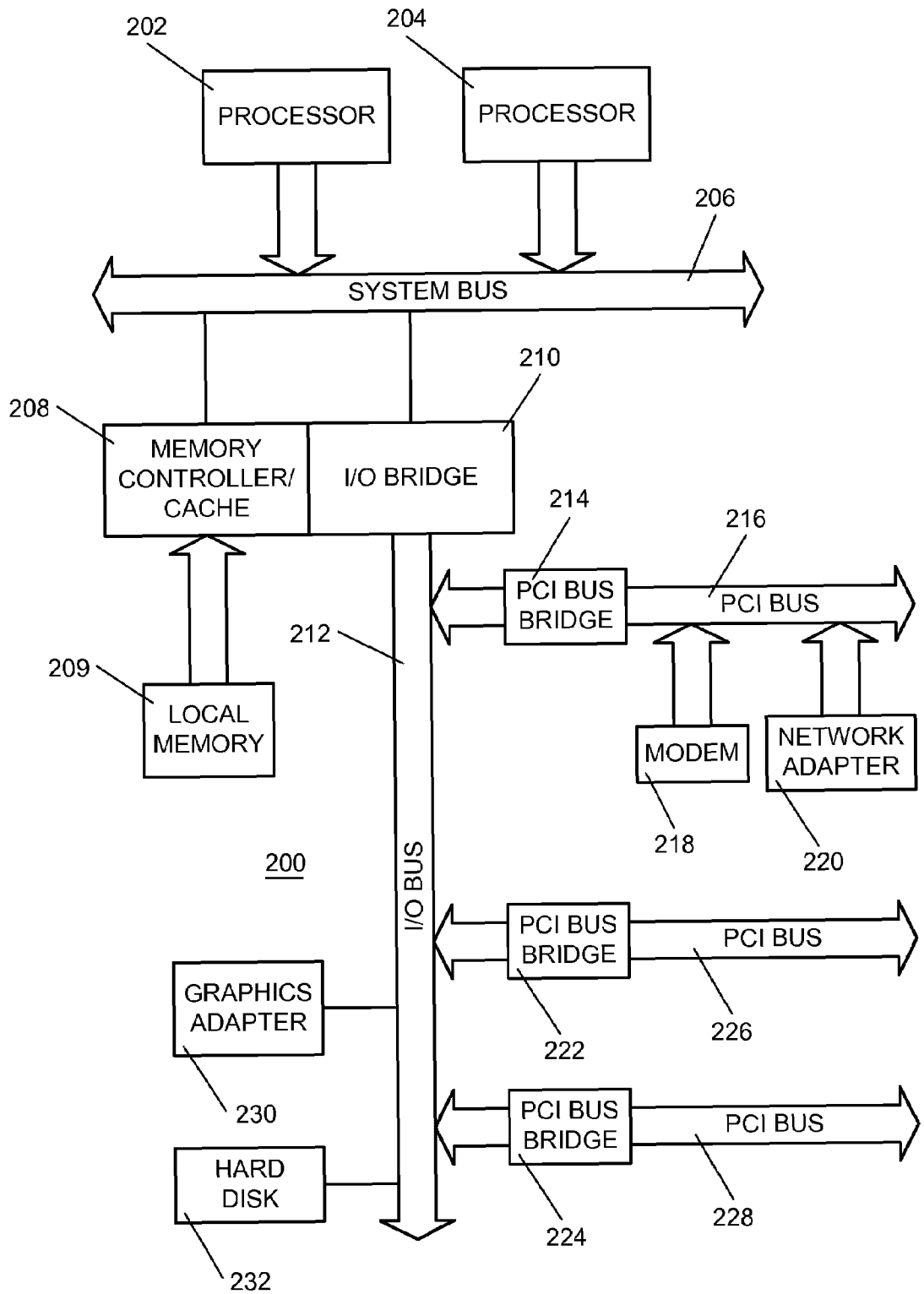
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
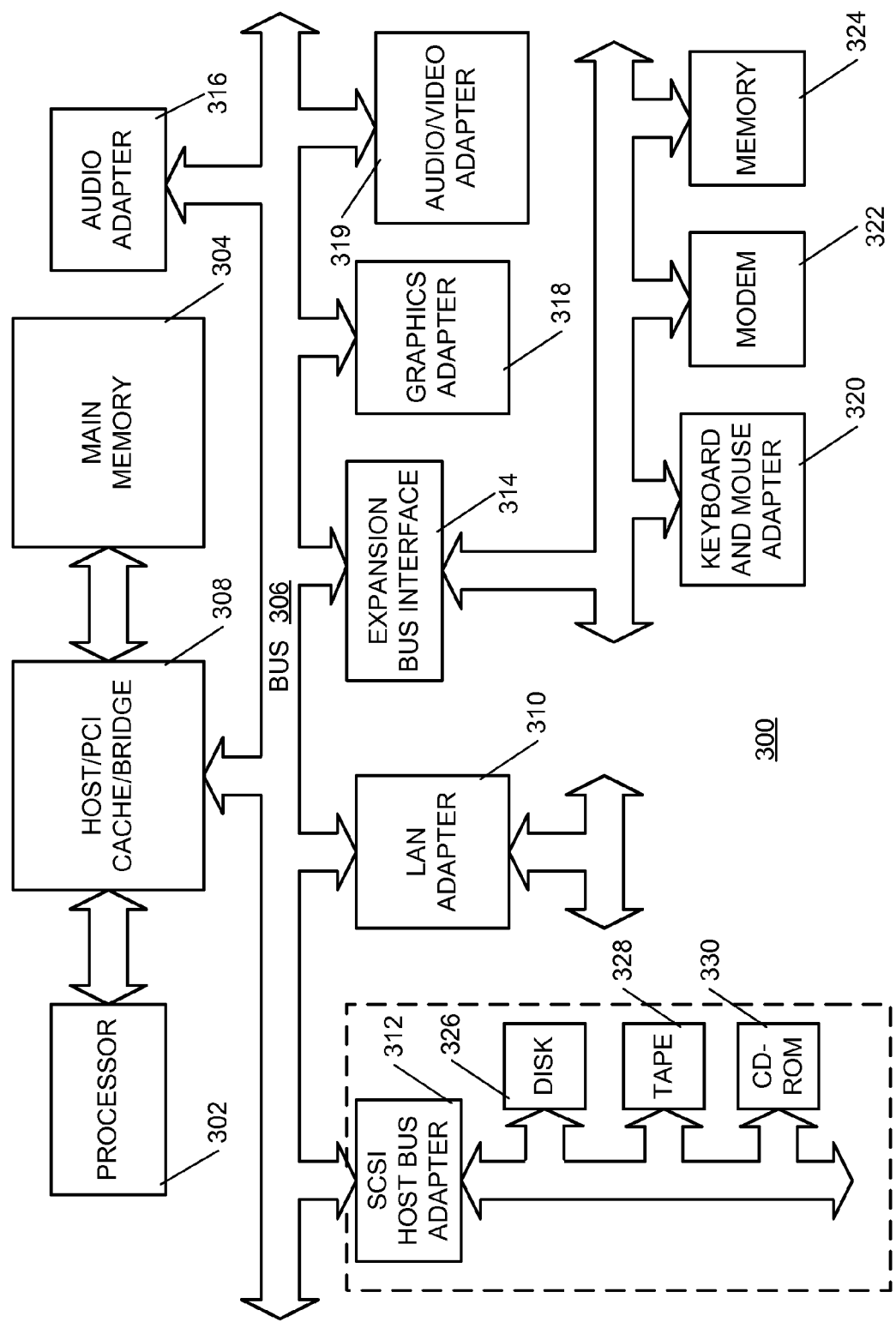
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP®, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a PDA. Further, data processing system 300 may also be a kiosk or a Web appliance.

The present invention provides a system, computer program product and method of automatically removing leading and trailing space characters from data being entered into a database system. The invention is preferably local to the server 104 especially when the database system is on the server 104. Nonetheless, it may reside on any one of the clients 108, 110 and 112 that is being used to enter data in the database system.

Generally, to enter data in a database system, a table has to be first created using a "create" command. The present invention proposes to use a new attribute (e.g., NO SPACE) with the "create" command. The new attribute is used to instruct the database system to remove all leading and trailing space characters before entering data or updating the data in the created table.

Figures 4, 5, 6, 7:
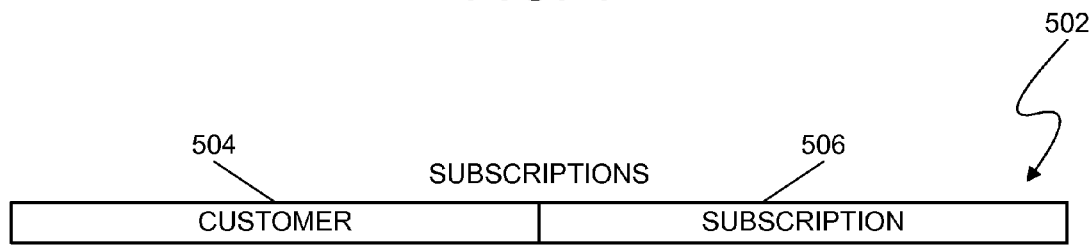
FIG. 4 depicts an exemplary command that may be used by the present invention to create a table into which data may be entered.
FIG. 5 depicts a subscriptions table created in response to the command in FIG. 4.
FIG. 6 illustrates an exemplary insert command.
FIG. 7 displays a subscriptions table into which data has been entered.

FIG. 4 depicts an exemplary command that may be used by the present invention to create a table into which data may be entered. The table will be a "subscriptions" table into which names of customers that have subscribed to magazines as well as the names of the magazines are to be entered. As is well known in the field, the command "create table subscriptions" 402 instructs the database system to create a table by the name of "subscriptions". The table will have two columns, a "customer" column 404 and a "subscription" column 406. Both the "customer" column 404 and the "subscription" column 406 will hold data characters as indicated by varchar(16) 408 and varchar(64) 414. The "customer" column 404 may not be empty (see not null 410) while the "subscription" column 406 may be empty since it does not have a "NOT NULL" attribute.

FIG. 5 depicts a subscriptions table 502 created in response to the command in FIG. 4. As mentioned above, the subscriptions table 502 has a "customer" column 504 and a "subscription" column 506. Note that the table only has one row (the row into which the table headers "customer" and "subscription" are entered) since data has not yet been entered into the table and the "customer" column 504 may not be empty.

In any event, to enter data into the table 502, an insert command is used. FIG. 6 illustrates an exemplary insert command (i.e., "insert into subscriptions command" 602). The insert command 602 instructs the database system to enter values "John Doe" 604 and "Time" 606 into "customer" column 504 and "subscription" column 506, respectively, of the subscriptions table 502. Note that a leading space character (or space characters) 610 and a trailing space character (or space characters) 612 have somehow been added to the customer name "John Doe" 604 while a trailing space character (or space characters) 616 has been added to the magazine name "Time" 606.

According to the present invention, before the value "John Doe" 604 is entered into the "customer" column 504 and the value "Time" 606 is entered into the "subscription" column 506 of the subscriptions table 502 by the database system, all leading and/or trailing space characters will be removed since the database system has been instructed to do so (see the "no space" attributes 410 and 416 of the create command in FIG. 4). Hence, the use of the TRIM function is obviated by the invention. FIG. 7 displays the subscriptions table 502 after the values "John Doe" 604 and "Time" 606 have been entered into the "user" column 504 and the "subscription" column 506, respectively.

To retrieve data from the database system, a SELECT statement is used. The SELECT statement is one of the most common SQL queries executed by a DBMS query engine. In the SQL standard, the SELECT statement has the general format: "SELECT<clause> FROM<clause> WHERE<clause> GROUP BY<clause> HAVING<clause> ORDER BY<clause>." The clauses must follow this sequence. However, only the SELECT and FROM clauses are required. All other clauses are optional.

The result of a SELECT statement is a subset of data retrieved by the DBMS query engine from one or more existing tables stored in the database system, wherein the FROM clause identifies the name of the table or tables from which data is to be selected. The subset of data is treated as a new table, termed the result table.

When data in a database system may include leading and/or trailing space characters, the SELECT command may include one or more TRIM functions. FIG. 8 depicts a command that may be used to retrieve the names of all customers who have subscribed to Time magazine from such a database system. In the command, both a right trim function (i.e., RTRIM 802 and RTRIM 806) and a left trim function (i.e., LTRIM 804 and LTRIM 808) are used to remove leading and/or trailing space characters, which may have been included in the values in the "customer" column and the "subscription" column of the table.

As mentioned before, the use of the TRIM functions can cause SQL statements to be unreadable especially when the TRIM functions are used on a lot of attributes. Thus, in cases where data in a database system may include leading and/or trailing space characters, the present invention advocates the use of a new function (i.e., TRIMALL function) to remove all leading and/or trailing space characters from data that is being retrieved from the database system. This will make the SQL commands or the program itself (when the TRIM functions are instead included in the program) to be less cluttered and more readable.

FIG. 9 illustrates the use of the TRIMALL function (i.e., TRIMALL function 902) in an SQL SELECT statement. As is readily seen, the SQL SELECT statement in FIG. 9 is a lot more readable than the SQL SELECT statement in FIG. 8.

Figure 10:
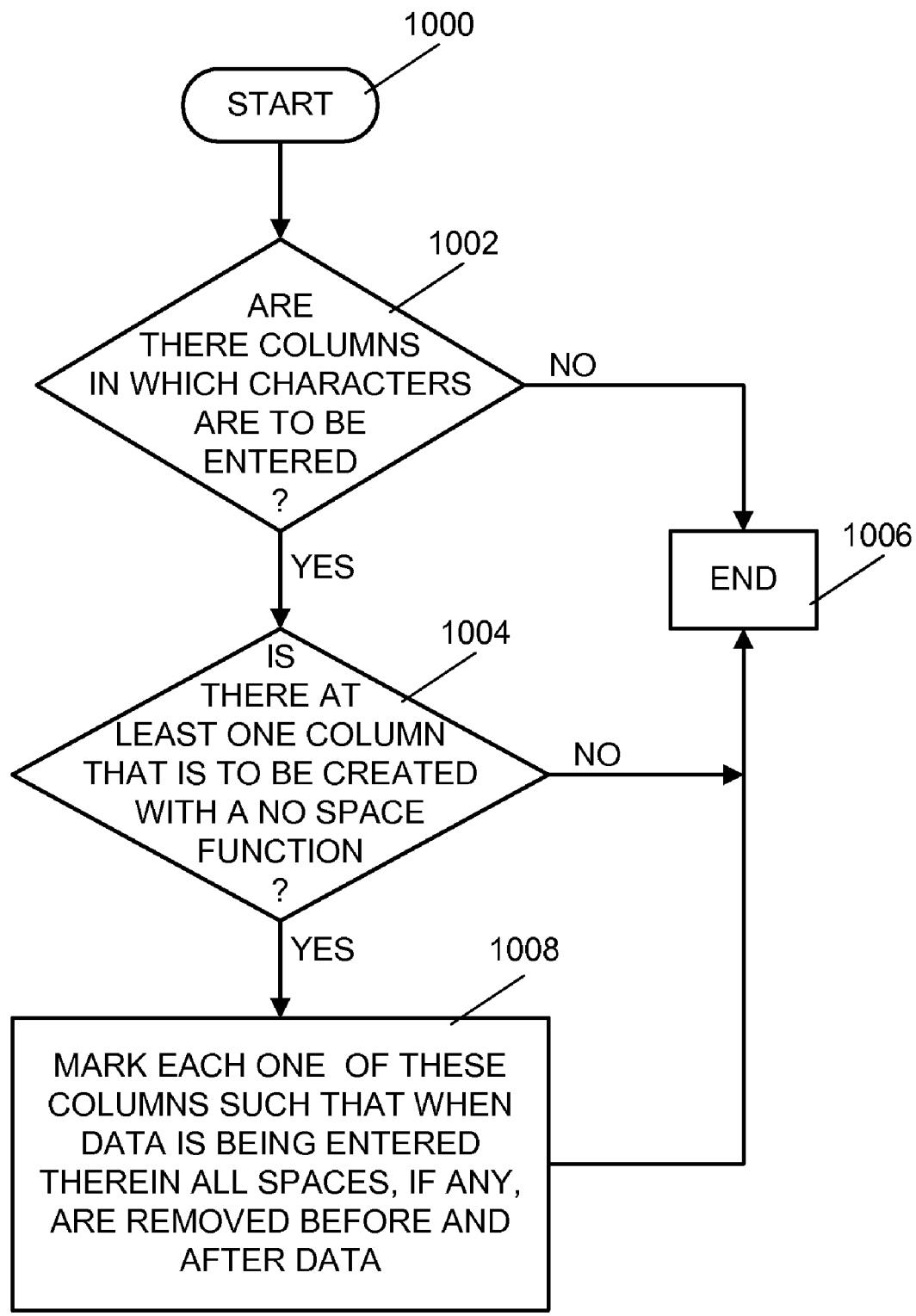
FIG. 10 depicts a flowchart of a process that may be used when creating tables into which data will be entered with no leading and/or trailing space characters.

FIG. 10 depicts a flowchart of a process that may be used when creating tables into which data will be entered with no leading and/or trailing space characters. The process starts when a create table command is sent to the database system (step 1000). At that point, a check is made to determine whether data defined as characters are to be entered in any one of the columns of the table (step 1002). If not, the process ends (step 1006).

If data defined as characters are to be entered into one or more columns of the table, another check is made to determine whether a NO SPACE function is associated with any one of those columns (step 1004). If not, the process ends (step 1006). Otherwise, each one of the columns into which data defined as characters are to be entered and which is associated with a NO SPACE function is marked as such to enable leading and/or trailing space characters, if any, to be removed from each piece of data before it is entered into the table (step 1008). The marking may be a bit in the column that is "zero" or "low" to indicate that all leading and/or trailing space characters are to be removed from a piece of data before it is entered into the column or "one" or "high" to indicate otherwise or vice versa. After marking the columns, the process ends (step 1006).

Figure 11:
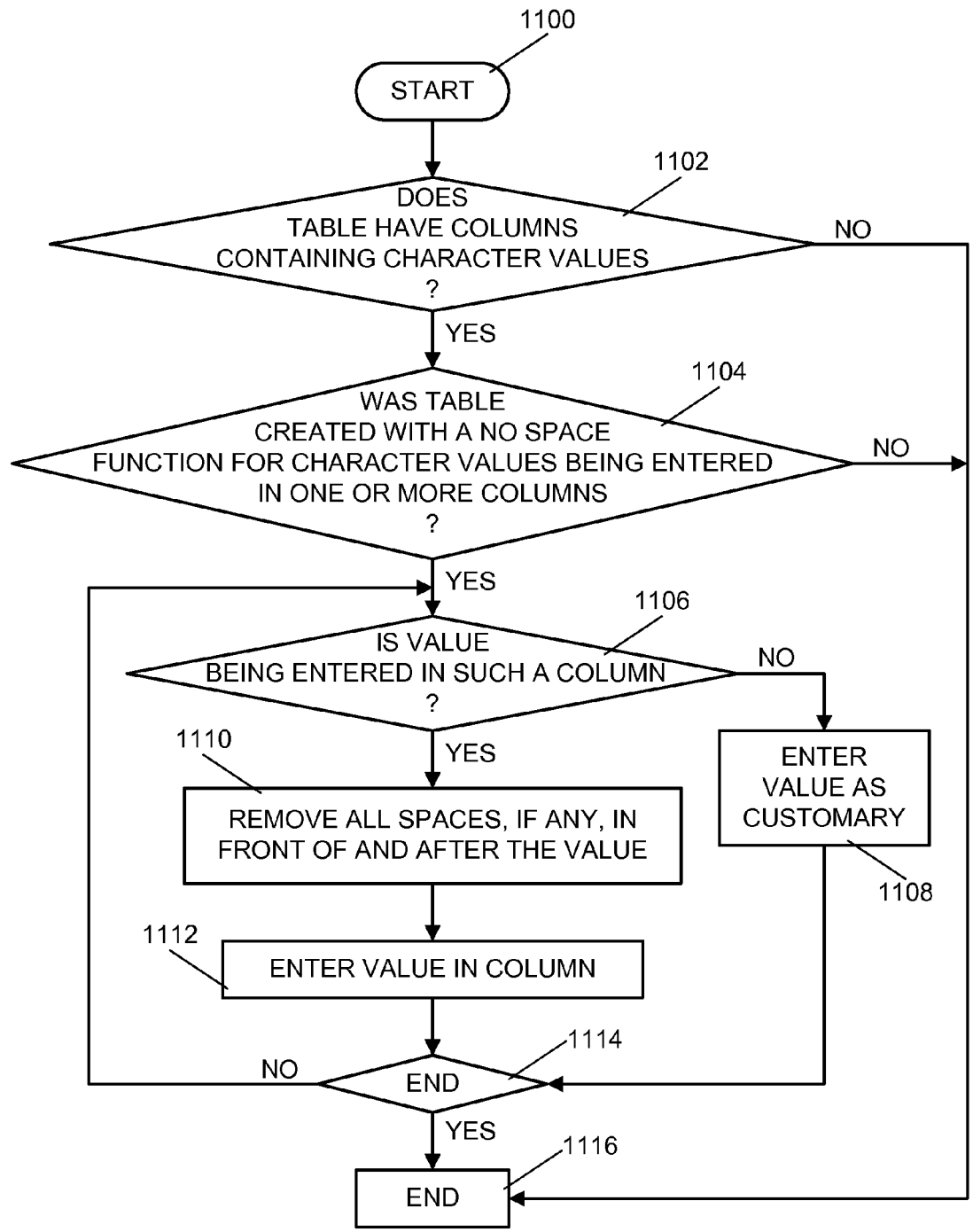
FIG. 11 depicts a flowchart of a process that may be used when data is being entered into a table that was created with a NO SPACE function associated with one or more columns.

FIG. 11 depicts a flowchart of a process that may be used when data is being entered into a table that was created with a NO SPACE function associated with one or more columns. The process starts when the INSERT statement is sent to the database system (step 1100). Then, a check is made to determine whether the table has columns into which data defined as characters are to be entered (step 1102). If not, the process ends (step 1116). If the table has columns into which data defined as characters are to be entered, then another check is made to determine whether at least one of those columns has an associated NO SPACE function (step 1104). If not, the process ends (step 1116).

If at least one of the columns into which data defined as characters are to be entered has an associated NO SPACE function, then a check is made to determine whether a value is being entered into that column (step 1106). If so, all space characters, if any, are removed in front of and after the value (step 1110). Once that is done, the value is entered into the column (step 1112) and a check is made to determine if anymore values are being entered into another column with an associated NO SPACE function (step 1114). If not, the process ends (step 1116) otherwise, the process jumps back to step 1106. If the value is not being entered into a column which has an associated NO SPACE function and into which data defined as characters are to be entered, then the value will be entered as customary (step 1108) and the process jumps to step 1114.

Figure 12:
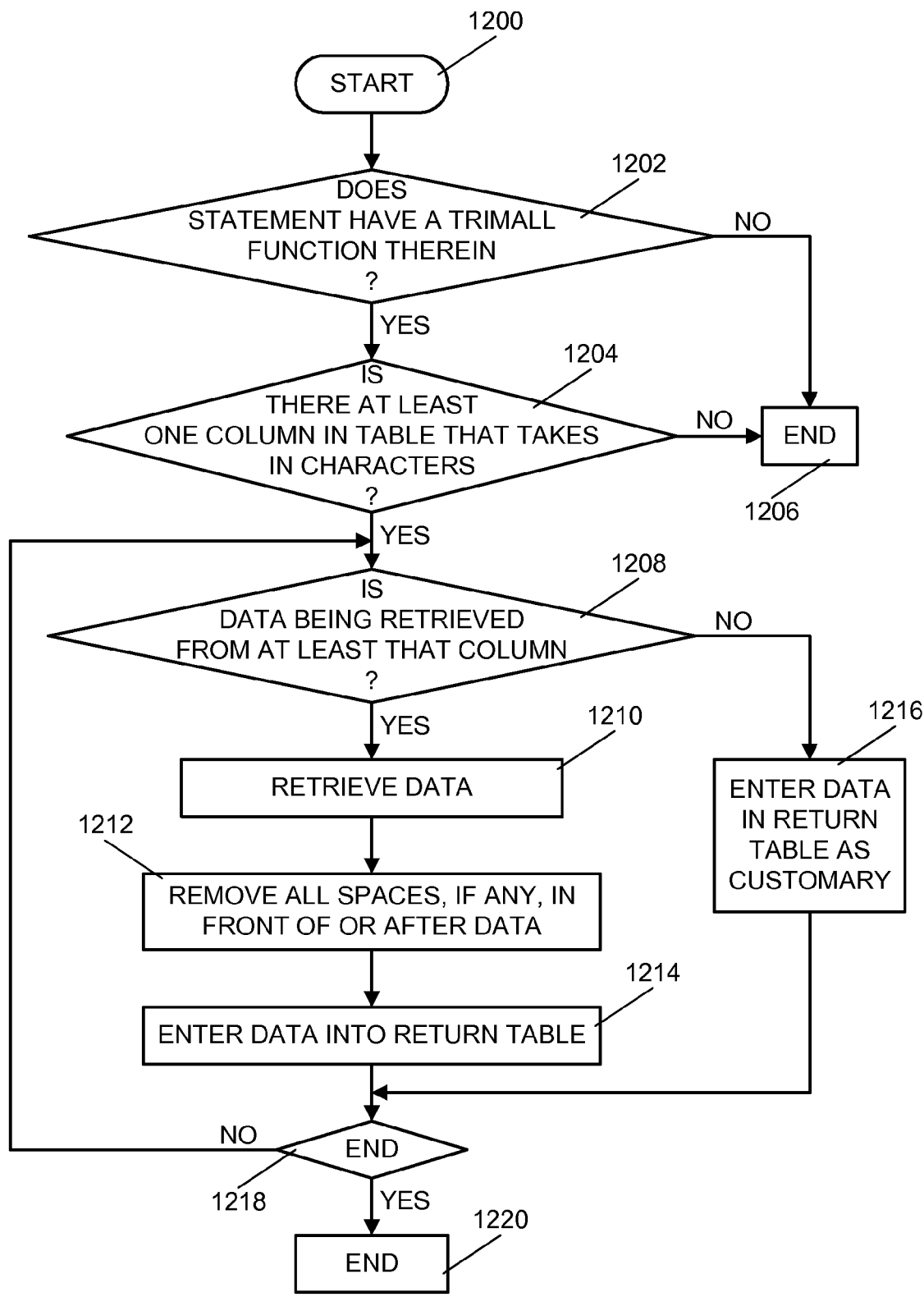
FIG. 12 depicts a flowchart of a process that may be used when retrieving data from a table containing data with leading and/or trailing space characters.

FIG. 12 depicts a flowchart of a process that may be used when retrieving data from a table containing data with leading and/or trailing space characters. The process starts when a SELECT statement is received by the database system (step 1200). A check is then made to determine whether the statement has a TRIMALL function integrated therein (step 1202). If not, the process ends (step 1206), otherwise, another check is undertaken to determine whether one or more columns of the table into which the data was entered contain data defined as character data (step 1204). Again, if not, the process ends (step 1206) otherwise, another check is made to determine whether data is being retrieved from one the columns (step 1208). If so, the data is retrieved (step 1210), any leading and/or trailing space characters are removed (step 1212) before the data is entered into the return table (step 1214). After entering the data into the return table, a check will be made to determine whether there is any more character data to be retrieved (step 1218). If not, the process ends (step 1220), otherwise, the process jumps back to step 1208. If data being retrieved is not from a column that contains character data, then the data is retrieved and entered in the return table as customary (step 1216) and the process jumps to step 1218.

The invention can take the form of a computer program product accessible from a computer-usable or computer-readable medium providing program code for use by or in connection with any of the computers in FIG. 1 or any other instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and Digital Video/Versatile Disk (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The description of the present invention has been presented for purposes of illustration and description, and is not intended to be exhaustive or limited to the invention in the form disclosed. Many modifications and variations will be apparent to those of ordinary skill in the art. For example, it should be apparent that the invention could be explained using a query language other than SQL. Thus, the use of the SQL in the description of the invention is only for illustrative purposes.

Hence, the embodiment was chosen and described in order to best explain the principles of the invention, the practical application and to enable others of ordinary skill in the art to understand the invention for various embodiments with various modifications as are suited to the particular use contemplated.

What is claimed is:

1. A computer implemented method of automatically removing space characters from data being entered into a database system comprising:

creating a table through which data is to be entered into the database system, the table having at least one column;

indicating upon creation of the table whether leading and trailing space characters from data being entered into the at least one column are to be removed;

enabling a user to issue an insert command in order to enter the data into the at least one column;

determining, in response to receiving the insert command, whether there is an indication associated with the at least one column that leading and trailing space characters from the data being entered into the at least one column are to be removed, removing leading and trailing space characters from the data being entered into the at least one column if it is determined that there is an indication that leading and trailing space characters from the data being entered into the at least one column are to be removed;

leaving leading and trailing space characters from the data being entered into the at least one column if it is determined that there is not an indication that leading and trailing space characters from the data being entered into the at least one column are to be removed; and entering the data into the at least one column.

2. The computer implemented method of claim 1 wherein indicating upon creation of the table whether leading and trailing space characters from data being entered into the at least one column are to be removed includes determining whether the data to be entered into the at least one column is character data.

3. The computer implemented method of claim 2 wherein the indication is a bit set in the at least one column.

4. The computer implemented method of claim 3 wherein the data is being entered to update data in the table.

* * * * *